UNITED STATES PATENT OFFICE.

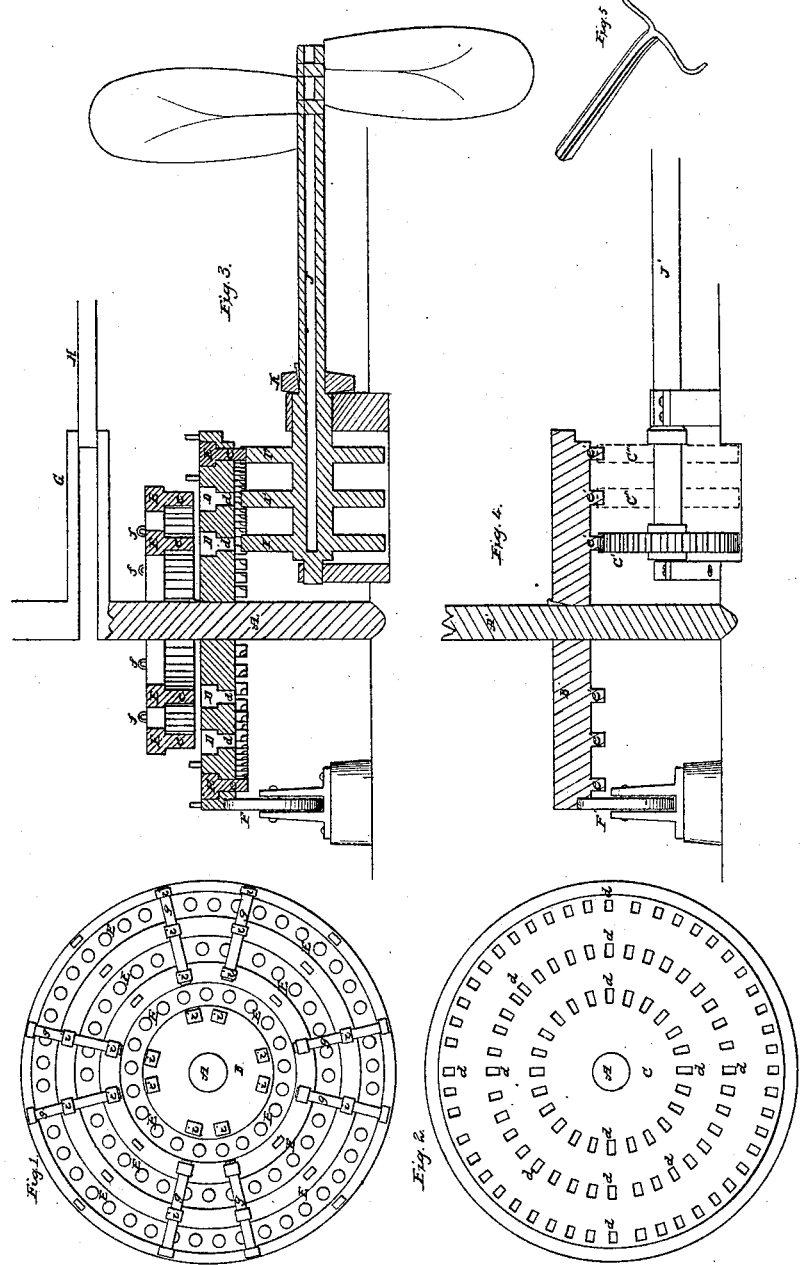

WILLIAM WEBSTER, OF JEFFERSON COUNTY, WASHINGTON TERRITORY.

GEARING FOR MACHINERY.

Specification of Letters Patent No. 20,672, dated June 22, 1858.

*To all whom it may concern:*

Be it known that I, WILLIAM WEBSTER, of Jefferson county, in the Territory of Washington, have invented certain new and useful Improvements in Gearing for Increasing and Diminishing the Speed of the Driven Machinery without Altering the Rate of the Prime Mover; and I do hereby declare the following to be a correct description of the same, reference being had to the accompanying drawings, making part of this specification, in which—

Figure 1 is a top view of my improved cog wheel; Fig. 2, is a bottom view of the bottom plate of the wheel showing the perforations through which the cogs pass. Fig. 3, is a central, vertical, longitudinal section through the machinery shown here applied to a propeller shaft. Fig. 4, is a vertical, central, longitudinal section of a modification of my plan applied also to driving a propeller shaft; Fig. 5 is a view of the lever used for removing the cogs.

The same part is indicated by the same letter of reference in all the figures.

The nature of my invention consists in the employment in a face wheel of any required number of concentric, removable rings of cogs gearing into a corresponding number of uniform pinions either one of said rings being thrown into gear with its appropriate pinion at will, thus causing a change of speed corresponding with the change of proportion between the diameter of cog rings and that of the pinion—all as hereinafter more particularly specified.

In the drawings A marks the shaft of the cog wheel; B, the upper face of said wheel; C, the lower face of the same; D, D, D, D, annular grooves in the upper face of said wheel for the reception of the cog rings; d, d, d, d, &c., mortises through which the cogs pass; E, E, E, E, annular segments fitting into grooves D, D, D, &c. e, e, e, e, &c., cogs passing through the mortises d, d, &c.; f, f, f, eyes for the reception of the hook lever, Fig. 5, by which the segments E, E, &c., are lifted out of and into the grooves D, D, &c.; g', g', g', &c., bolts for confining the cogged segments E, &c., to place; i, i, i, &c. staples through which bolts g g' g' &c., work; F friction rollers; G, crank; H piston rod of oscillating engine; I, I', I'', pinions driven by segments E, E, E; J, propeller shaft; K pawl.

In Fig. 4 A' marks the shaft and B' the body of a solid wheel having three rings of cogs e' e' e' on its lower face. C' represents a shifting pinion capable of being shifted at will along its shaft J' to the positions shown in dotted lines at C'' and C'''. F' marks a supporting friction roller.

My improved gearing I have shown as applied to a ship's propeller or fins, but it is obviously applicable to a variety of cases in which a sudden change of speed is required.

At that end of the shaft J where the power is applied I place, as shown, three pinions I, I', I'', of equal diameters and mashing respectively into three concentric rings of cogs E, E, E, &c., on the face of the compound annular wheel, placed horizontally above the pinions and turning on a vertical shaft A. These rings of cogs are so made as to be capable of being raised up out of gear with the pinions at pleasure. For this purpose they are made in segments and when down in place are fixed by bolts as shown. By withdrawing these bolts, they are liberated and can readily be raised up by means of the lever, Fig. 5, or other suitable device. When the wheel is in motion only one ring of cogs and one pinion will be in gear. The speed of the driven shaft will depend upon the particular ring and pinion that are in gear, the greatest speed being imparted by the outermost ring, and the least by the central and smallest one. The speed can be varied at will without altering the stroke of the engine by throwing either ring into gear with its appropriate pinion.

The weight of the wheel is supported by three or more friction rollers, P, near its periphery, and the lower end of shaft A rests upon a friction bearing.

The crank (G), driving the shaft A, works horizontally, as shown in Fig. 3 and is driven by the piston rod of the oscillating cylinder of an engine of ordinary construction.

Fig. 4, is an obvious modification of my invention. The wheel is here solid, the cogs not removable, and a single shifting pinion replaces the three fixed pinions in the other device.

Having thus fully described my invention what I claim and desire to secure by Letters Patent is—

1. The compound annular cog wheel hereinbefore described, the same being constructed and operating substantially in the manner specified.

2. I also claim, in combination with a wheel having two or more concentric rings of cogs, the use of a corresponding number of pinions on one shaft, or of a shifting pinion arranged for combined operation with the wheel substantially as and for the purpose specified.

The above specification signed and witnessed this second day of June A. D. 1858.

WM. WEBSTER.

Witnesses:
R. T. CAMPBELL,
CHAS. F. STANSBURY.